US008730515B2

(12) United States Patent
Toriumi et al.

(10) Patent No.: US 8,730,515 B2
(45) Date of Patent: May 20, 2014

(54) RECORDING MEDIUM HAVING PRINTING CONTROL PROGRAM THEREON, PRINTING CONTROL APPARATUS, AND PRINTING CONTROL METHOD

(75) Inventors: Takashi Toriumi, Kanagawa (JP); Akihiro Kinoshita, Tokyo (JP); Yoshikazu Tanaka, Tokyo (JP); Shizhong Zhu, Tokyo (JP); Yongtao Liang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 13/359,179

(22) Filed: Jan. 26, 2012

(65) Prior Publication Data

US 2012/0194834 A1 Aug. 2, 2012

(30) Foreign Application Priority Data

Feb. 1, 2011 (JP) ................................. 2011-020221
Jan. 6, 2012 (JP) ................................. 2012-001561

(51) Int. Cl.
*G06F 3/12* (2006.01)
(52) U.S. Cl.
USPC ....... 358/1.18; 358/1.12; 358/1.14; 358/1.15; 399/81; 399/382
(58) Field of Classification Search
CPC .................. G03G 15/655; G03G 2215/00523; G03G 2215/00894; G03G 15/6573; G03G 2215/00421; B45H 2701/11132; H04B 1/00567
USPC ........... 358/1.12–1.15, 1.18; 399/382, 81, 82; 271/3.14
See application file for complete search history.

(56) References Cited

U.S. PATENT DOCUMENTS

| 6,393,232 | B1 * | 5/2002 | Osari et al. ....................... 399/82 |
| 6,782,218 | B2 * | 8/2004 | Sekiguchi et al. .............. 399/81 |
| 6,799,005 | B2 * | 9/2004 | Bodine et al. ................... 399/82 |
| 6,971,809 | B1 * | 12/2005 | Housel et al. ................. 400/582 |
| 7,097,369 | B2 * | 8/2006 | Barry et al. ..................... 400/62 |
| 7,547,010 | B2 * | 6/2009 | Yokobori et al. ............. 271/9.01 |
| 7,553,095 | B2 * | 6/2009 | Kimura ........................... 400/62 |
| 7,651,081 | B2 * | 1/2010 | Yokobori et al. .......... 270/58.23 |
| 7,848,673 | B2 * | 12/2010 | Sakuraba et al. .............. 399/81 |
| 7,862,029 | B2 * | 1/2011 | Yokobori et al. ............ 271/3.14 |
| 7,983,584 | B2 * | 7/2011 | Okamoto et al. ............... 399/82 |

(Continued)

FOREIGN PATENT DOCUMENTS

JP 2006-251880 A 9/2006
JP 2006-284772 A 10/2006

(Continued)

*Primary Examiner* — Dennis Dicker
(74) *Attorney, Agent, or Firm* — Harness, Dickey & Pierce, P.L.C.

(57) ABSTRACT

A printing control program is disclosed which causes a computer to function as a calculating unit; a page data generating unit which generates page data for outputting unused tab sheets; a job data generating unit which generates one job data set into which a first data job set and a second data set are combined, the first job data set being for outputting a printed output to a first sheet-discharging destination based on manuscript submission data and the second job data set being for outputting the unused tab sheet to a second sheet-discharging destination based on the page data; and a job data transmitting unit which transmits the one job data set to a job management unit which causes information on job data to be displayed on a display apparatus.

7 Claims, 16 Drawing Sheets

(56) References Cited

U.S. PATENT DOCUMENTS

| | | | | |
|---|---|---|---|---|
| 8,045,912 | B2 * | 10/2011 | Ushio | 399/382 |
| 8,100,392 | B2 * | 1/2012 | Shinchi et al. | 270/58.31 |
| 8,139,259 | B2 * | 3/2012 | Shinchi et al. | 358/1.18 |
| 2004/0263869 | A1 * | 12/2004 | Kimura | 358/1.1 |
| 2007/0229901 | A1 | 10/2007 | Kusakabe | |
| 2007/0253029 | A1 | 11/2007 | Yamaguchi | |
| 2008/0018093 | A1 | 1/2008 | Shinchi et al. | |
| 2008/0199200 | A1 * | 8/2008 | Nakagawa et al. | 399/81 |
| 2009/0323109 | A1 | 12/2009 | Mori | |

FOREIGN PATENT DOCUMENTS

| | | |
|---|---|---|
| JP | 2007-279832 A | 10/2007 |
| JP | 2007-299286 A | 11/2007 |
| JP | 2008-023831 A | 2/2008 |
| JP | 2008-168440 A | 7/2008 |
| JP | 2009-134440 A | 6/2009 |
| JP | 2010-009219 A | 1/2010 |

* cited by examiner

FIG. 14

RECORDING MEDIUM HAVING PRINTING CONTROL PROGRAM THEREON, PRINTING CONTROL APPARATUS, AND PRINTING CONTROL METHOD

TECHNICAL FIELD

The present invention relates to a printing control program having a function of inserting a tab sheet, a printing control apparatus, a printing control method, and a recording medium which has recorded thereon the printing control program.

BACKGROUND ART

In a commercial printing industry in which printed matter (a catalog, an advertisement, etc.) is received from a customer, a printed output which the customer desires is generated from the printed matter, and the printed output is delivered to the customer to gain remuneration, multiple steps from receiving of the printed matter to delivering are followed to conduct operations. Steps from the receiving of the printed matter to the delivering include the customer submitting a manuscript for the printed matter, accepting of printing conditions of the printed output, color correcting, layout correcting, and stitch position correcting as pre-press operations; proof printing for the customer to confirm pre-press results; printing operations; and a post-process treatment such as compression bonding, printing stitching after printing, and delivering of the printed output to the customer. Increase/decrease occurs for the steps from the receiving of the printed matter to the delivering depending on the printing conditions of the printed output which the customer desires.

In the commercial printing industry, with many orders for printed matter being received from a customer to perform high-volume printing, the above-described steps are used to handle high-volume production of printed outputs. Moreover, a printing condition of the printed output from the customer is often fixed for the printed matter for performing the high-volume printing. Thus, in the commercial printing industry, a printed output which the customer desires is generated in a printing cycle in which the high-volume printing is performed with one determined printing condition and printing of a lot is completed, after which the printing condition is changed and the high-volume printing is performed again.

In such a printing cycle, the above-described multiple steps occur when the printing condition is changed. Therefore, when there is no change to the printing condition, a commercial printing vendor can perform consecutive printing within the same step, making it possible to perform an efficient high-volume printing operation.

Recently, in the commercial printing industry, a so-called POD (Printed On Demand) market is emerging in which a relatively small lot of printed matter is delivered to a customer in a short lead time. In the POD market, orders are often received from multiple customers. As a result, in the POD market, printing conditions of printed outputs and printed matter for which a manuscript is submitted to the commercial printing vendor are often diverse.

At the same time, in these years, digitization of the printed matter is in progress, so that control is conducted for generating the printed matter using a computer. For example, a technique called a workflow is emerging in which a manuscript for printed matter is submitted over a network as electronic data, and the above-described multiple steps are controlled, for example. For example, the above-described workflow also includes a workflow in which a printing operation with the above-described multiple steps is defined with a job ticket called a JDF (Job Definition Format) and the printing operation is controlled with a printing system.

With such changes in the printing environment, the commercial printing vendors have been promoting computerization of the printing system for generating the printed matter for which an order is received. On the other hand, it is becoming necessary for the commercial printing vendors to build a printing system which can handle diverse printing conditions of the printed output from the customer. Moreover, in order to generate diverse printed outputs as a desire of the customer, it is also becoming necessary to respond in system aspects such as introducing multiple printing apparatuses and device (peripheral) apparatuses and to respond in operation step aspects such as changing the-above described multiple steps in a relatively short cycle.

It is becoming necessary for the commercial printing vendor to respond in the above-described manner, but it is also becoming necessary to make a further operational efficiency improvement for generating profits. Simplifying operations is one measure which leads to improving the operational efficiency.

For example, in a pre-press operation is included an operation of inserting a tab sheet to generate printed matter. A printing apparatus which produces a printed output while inserting a tab sheet between pages is known in the related art. (See Patent document 1, for example).

In the related-art printing apparatus, multiple sets of five tab sheets as constituting elements, for example, with a tab position of which of the tab sheets being successively offset, are superposed to be placed in a sheet-supplying tray. In the related art printing apparatus, if only first three tab sheets are used in a printing job, the remaining two tab sheets, i.e., the fourth and fifth tab sheets, become no longer necessary and must be discharged. This is because it is necessary to first supply a first tab sheet of the one tab sheet set at the time of executing the next printing job, for example.

The related art printing apparatuses include an apparatus in which the tab sheet which became no longer necessary is discharged to a sheet-discharging tray which is different from a sheet-discharging tray to which a sheet on which a page within the printing job is printed is discharged, and an apparatus in which discharging is made to a different sheet-discharging tray for each kind of tab sheet. A process of setting the sheet-discharging tray of the tab sheet is also one example of simplifying the above-described operations. (See Patent document 1, for example.)

PATENT DOCUMENT

Patent Document 1: JP2008-23831A

Another possible measure which leads to improving operational efficiency is to indicate a progress status of a job such as a printing job, etc., in a printing system to an operator in the commercial printing vendor, etc. However, a process of discharging the tab sheet which became no longer necessary to the sheet-discharging tray, which is different from one to which the sheet on which the page within the printing job is printed is discharged, would be a different job from the printing job.

Thus, in the related-art printing system, there is a problem that ease of use is poor as the progress status for not only the printing job, but also for the job of the process of discharging the tab sheet which became no longer necessary to the sheet-discharging tray is indicated to the operator.

DISCLOSURE OF THE INVENTION

In light of the problems as described above, an object of the present invention is to provide a printing control program which makes it possible to show, as one job, a printing job and a job for discharging a tab sheet which no longer became necessary to a sheet-discharging destination, a printing control apparatus, a printing control method, and a recording medium which has recorded thereon the printing control program.

According to an embodiment of the present invention, a printing control program is provided which causes a computer to function as a calculating unit which calculates the number of unused tab sheets based on setting information on a tab sheet to be inserted into manuscript submission data; a page data generating unit which generates page data for outputting the unused tab sheets, the number of which unused tab sheets corresponding to the calculated number of the unused tab sheets; a job data generating unit which generates one job data set into which a first data job set and a second data set are combined, the first job data set being for outputting a printed output to a first sheet-discharging destination based on the manuscript submission data and the second job data set being for outputting the unused tab sheet to a second sheet-discharging destination based on the page data; and a job data transmitting unit which transmits the one job data set to a job management unit which causes information on job data to be displayed on a display apparatus.

An element, an expression, or an arbitrary combination of the elements being applied to methods, apparatuses, systems, computer programs, recording media, data structures, etc., is also applicable as embodiments of the present invention.

The embodiments of the present invention make it possible to show, as one job, a printing job and a job for discharging a tab sheet which became no longer necessary to a sheet-discharging destination.

BRIEF DESCRIPTION OF THE DRAWINGS

Other objects, features, and advantages of the present invention will become more apparent from the following detailed descriptions when read in conjunction with the accompanying drawings, in which:

FIG. 14 is an image diagram of an exemplary "sheet/pagination/post-processing" screen;

BEST MODE FOR CARRYING OUT THE INVENTION

In the following, best modes for carrying out the invention are described based on the following embodiments with reference to the drawings.

Embodiment 1
System Configuration

Figure 1:
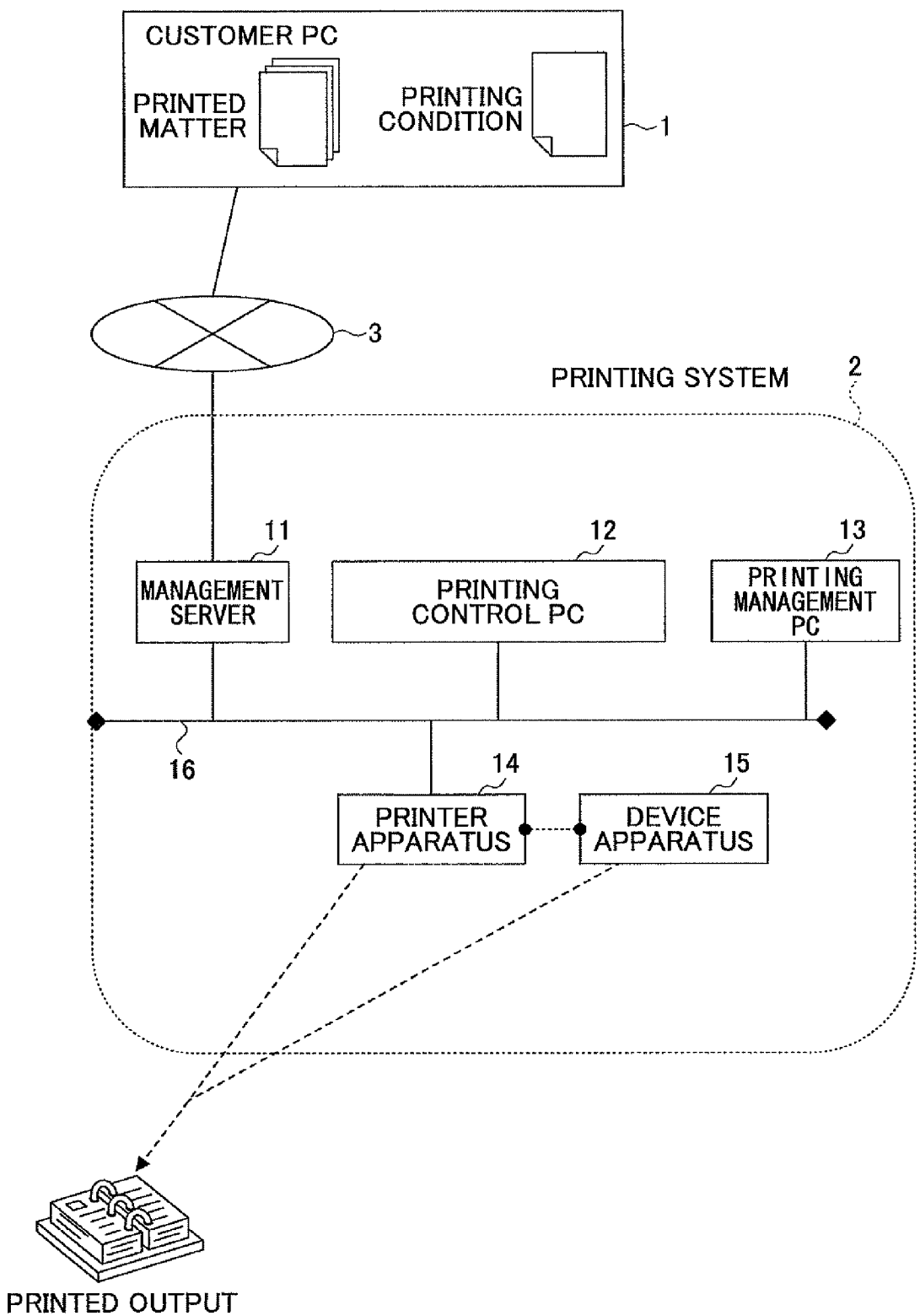
FIG. 1 is a system configuration diagram of an example which includes a printing system to which the present invention is applied.

FIG. 1 is a system configuration diagram of an example which includes a printing system to which the present invention is applied. In the system configuration in FIG. 1, a customer PC 1 and a printing system 2 are connected via a network 3 such as the Internet, etc. The customer PC 1 is an apparatus used by a customer. The printing system 2 is a system used by an operator of a commercial printing vendor, etc.

Moreover, the printing system 2 has a management server 11, a printing control PC 12, a printing management PC 13, a printer apparatus 14, a device apparatus 15, and a network 16 such as a LAN, etc. The management server 11, the printing control PC 12, the printing management PC 13, and the printer apparatus 14 are connected via the network 16.

The management server 11 is an apparatus which manages manuscript submission data from the customer. The printing control PC 12 is an apparatus which performs printing control. The printing management PC 13 is an apparatus which performs printing management. The printer apparatus 14 is an apparatus which prints a printed output. The device apparatus 15, which is an apparatus needed in a printing process and post-treatment process, is connected to the printer apparatus 14.

The customer operates the customer PC 1 and transmits, to the management server 11 as the manuscript submission data, printing conditions and printing data for printed matter. The management server 11 manages the manuscript submission data received from the customer PC 1. The operator which generates the printed output using the printing system 2 accesses the management server 11 from the printing control PC 12 to obtain the manuscript submission data and generates the printed output with the below-described printing control. Moreover, the printing control PC 12 obtains a status of the printing apparatus 14. The status of the printer apparatus 14 includes a status that the printer apparatus 14 is available for printing, a status that the printer apparatus is unavailable for printing, a status that the device apparatus 15 is connected to the printer apparatus 14, etc.

The printing management PC 13 manages execution results and execution conditions of a printing job being executed in the printer apparatus 14, for example, with below-described printing management, and displays the execution results and the execution conditions of the printing job as needed. The printing management PC 13 obtains the status of the printing apparatus 14.

Figure 2:
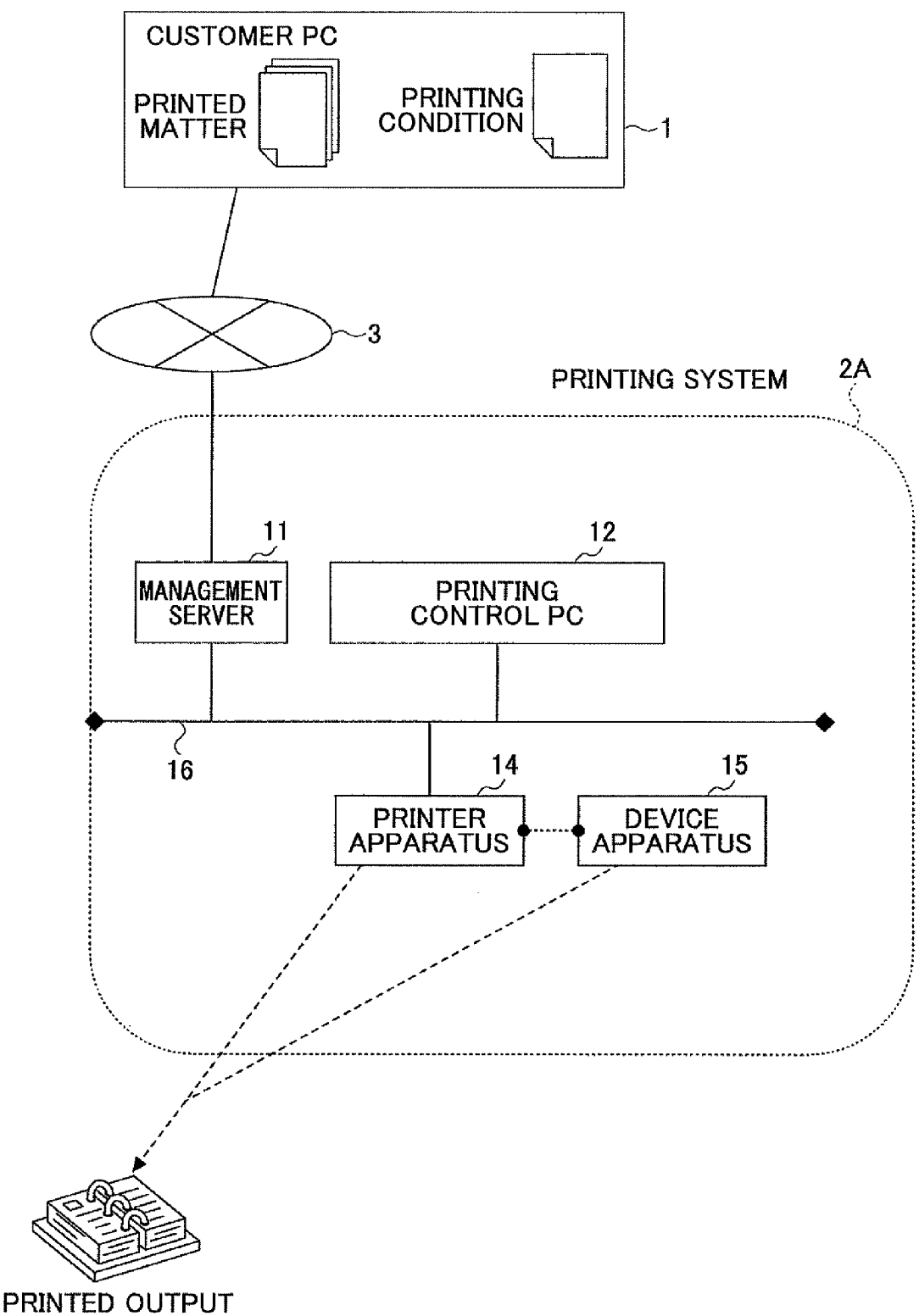
FIG. 2 is a system configuration diagram of another example which includes the printing system to which the present invention is applied.

FIG. 2 is a system configuration diagram of another example which includes the printing system to which the present invention is applied. In a printing system 2A in FIG. 2, the printing management PC 13 of the printing system 2 in FIG. 1 is omitted. In the printing system 2A, the printing control PC 12 has a function of the printing management PC 13. For the other system features, the printing system 2A is the same as the printing system 2, so that repeated explanations are omitted.

Hardware Configuration

Figure 3:
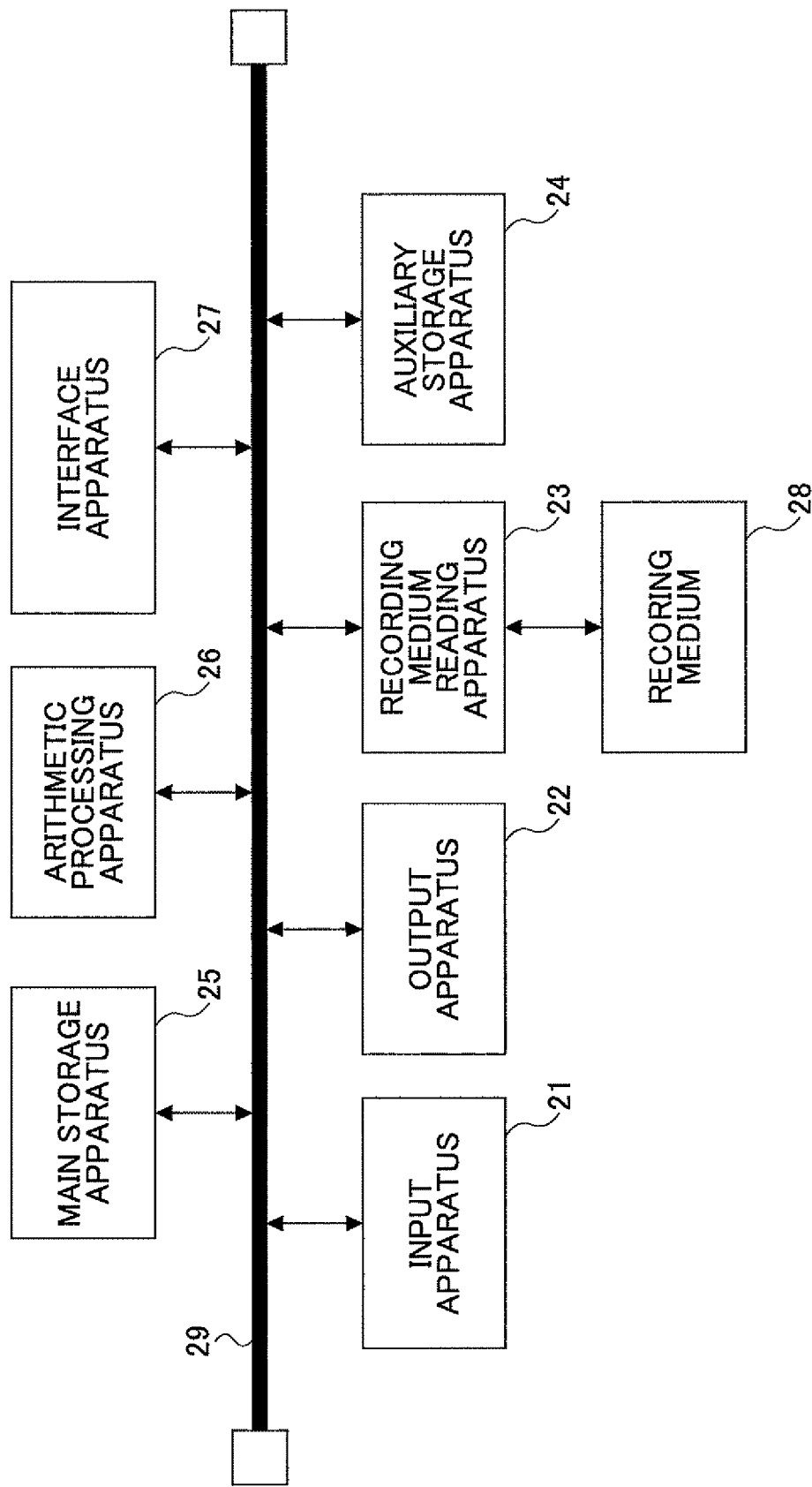
FIG. 3 is a hardware configuration diagram of an example of a PC.

The printing control PC 12 and the printing management PC 13 are implemented by a PC with a hardware configuration as shown in FIG. 3, for example. FIG. 3 is an exemplary hardware configuration diagram of the PC. A PC 20 includes an input apparatus 21, an output apparatus 22, a recording medium reading apparatus 23, an auxiliary storage apparatus 24, a main storage apparatus 25, an arithmetic processing apparatus 26, and an interface apparatus 27 that are mutually connected by a bus 29.

The input apparatus 21 includes a keyboard, a mouse, etc. The input apparatus 21 is used for inputting various signals. The output apparatus 22 includes a display apparatus, etc. The output apparatus 22 is used for displaying various windows, data, etc. The interface apparatus 27 includes a modem, a LAN card, etc. The interface apparatus 27 is used for connecting to the network 16.

A printing control program installed in the printing control PC 12 and a printing management program installed in the printing management PC 13 (which printing control program and printing management program are below called merely programs) are at least a part of various programs which control the PC 20. The program is provided by distributing a recording medium 28, downloading from the network 16, etc., for example.

For the recording medium 28, various types of recording media may be used such as a recording medium which optically, electrically, or magnetically records information such as a CD-ROM, a flexible disk, a magneto-optical disk, etc.; and a semiconductor memory which electrically records information such as a ROM, a flash memory, etc.

When the recording medium 28 storing the program is set in the recording medium reading apparatus 23, the program stored in the recording medium 28 is installed in the auxiliary storage apparatus 24 via the recording medium reading apparatus 23. Programs downloaded from the network 16, etc., are installed in the auxiliary storage apparatus 24 via the interface apparatus 27.

The auxiliary storage apparatus 24 stores the installed programs, a required file, data, etc. The main storage apparatus 25 reads the programs from the auxiliary storage apparatus 24 at the time of launching the programs. Then, the arithmetic processing apparatus 26 implements various processes as described below according to the programs stored in the main storage apparatus 25.

Software Configuration

Figure 4:
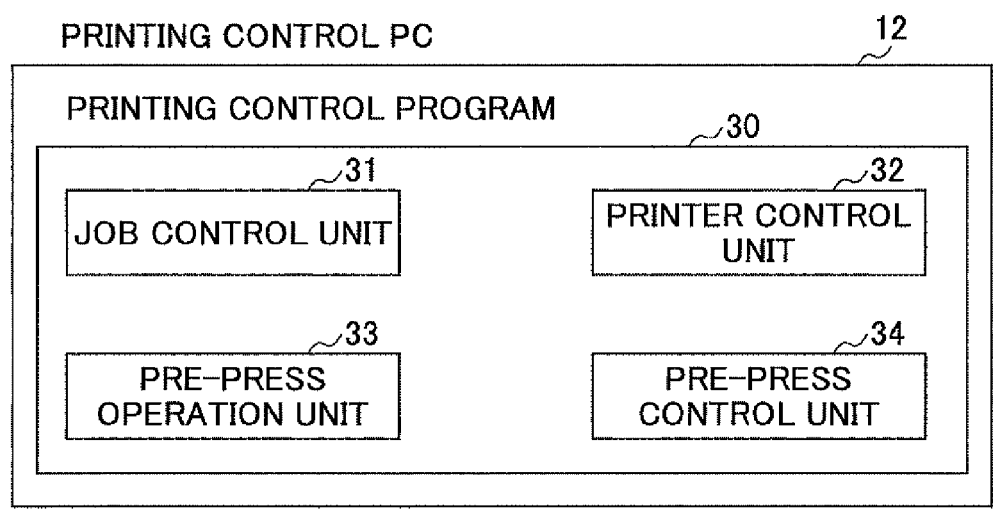
FIG. 4 is a processing block diagram of an example of a printing control PC.
Figure 5:
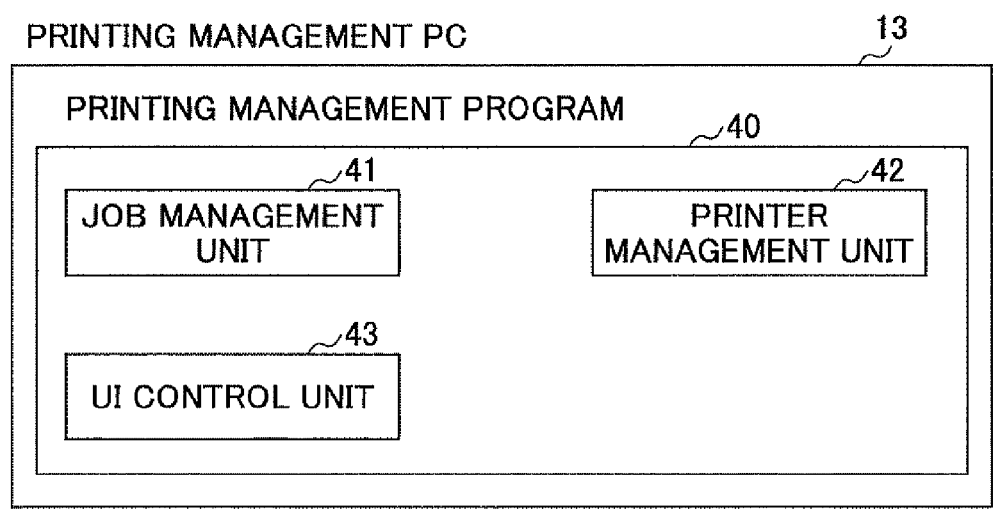
FIG. 5 is a processing block diagram of the example of the printing control PC.

For the system shown in FIG. 1, the printing control PC 12 and the printing management PC 13 are implemented in processing blocks shown in FIGS. 4 and 5, for example. FIG. 4 is a processing block diagram of an example of a printing control PC. FIG. 5 is a processing block diagram of an example of a printing management PC.

In the printing control PC 12 has installed a printing control program 30. The printing control PC 12 executes the printing control program 30 to implement a job control unit 31, a printer control unit 32, a pre-press operation unit 33, and a pre-press control unit 34.

The job control unit 31 generates a job (job data) in which the manuscript submission data are converted into a data format printable by the printer apparatus 14. The job control unit 31 performs a conversion into a data type such a common PS (PostScript) format, for example, as an example of the printable data format. Moreover, the printer control unit 32 obtains a status of the printer apparatus 14 and transmits the obtained status to the job control unit 31. Moreover, the printer control unit 32 controls a process of the printer apparatus 14 according to the job data.

The pre-press operation unit 33 accepts a printing setting from the operator. The accepted printing setting information is processed by the pre-press control unit 34. The pre-press control unit 34 communicates with the pre-press operation unit 33 and processes printing setting information such as a printing setting, etc., input from the pre-press operation unit 33.

As an example, when a pagination setting is carried out as a printing setting from the pre-press operation unit 33, pagination setting information is processed. The pre-press control unit 34 processes the pagination setting information to generate a JDF for printing the job data according to the pagination setting information. The pre-press control unit 34 stores the pagination setting information into the JDF.

Moreover, when a tab sheet printing setting is carried out as the printing setting from the pre-press operating unit 33, tab sheet printing setting information is processed. The pre-press control unit 34 processes the tab sheet printing setting information to generate a JDF for inserting a tab sheet between pages according to the tab sheet printing setting information. The pre-press control unit 34 stores the tab sheet printing setting information into the JDF.

FIG. 5 is a processing block diagram of an example of a printing management PC. In the printing management PC 13 is installed a printing management program 40. The printing management PC 13 executes the printing management program 40 to implement a job management unit 41, a printer management unit 42, and a UI control unit 43.

The job management unit 41 manages the execution results and the execution conditions of the printing job being executed in the printer apparatus 14. The printing management unit 42 manages the status of the printer apparatus 14. The UI control unit 43 causes a UI to display the execution results and the execution conditions of the printing job.

Figure 6:
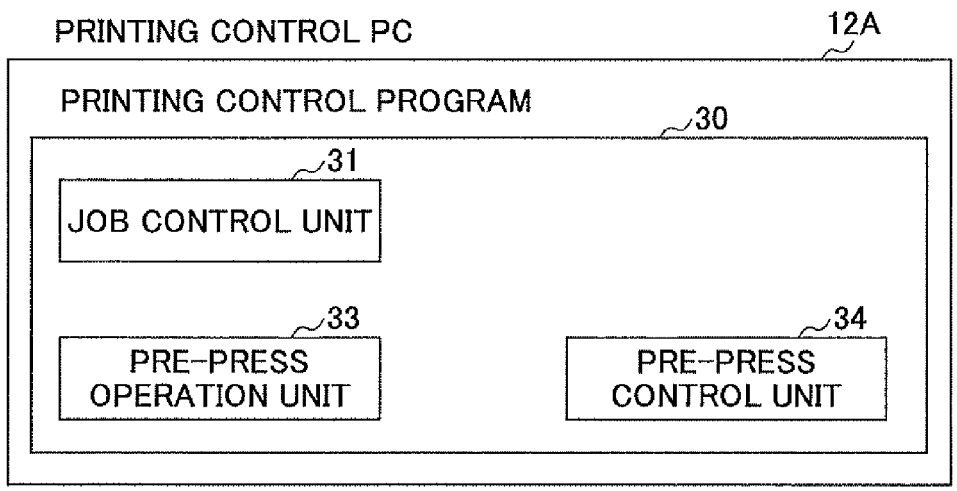
FIG. 6 is a processing block diagram of a different example of the printing control PC.
Figure 7:
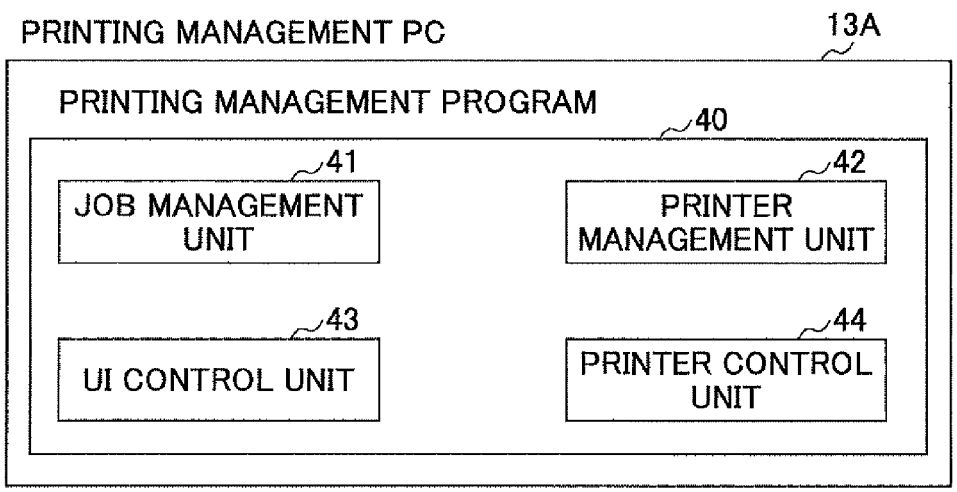
FIG. 7 is a processing block diagram of a different example of the printing control PC.

Moreover, for the system as shown in FIG. 1, the printing control PC 12 and the printing management PC 13 may also be implemented in processing blocks as shown in FIGS. 6 and 7, for example. FIG. 6 is a processing block diagram of a different example of the printing control PC. FIG. 7 is a processing block diagram of a different example of the printing management PC.

In a printing control PC 12A in FIG. 6 is omitted the printer control unit 32 of the printing control PC 12 in FIG. 4. A printing management PC 13A has, as a printer control unit 44, a function of the printer control unit 32 of the printing control PC 12. For the other processing block features, the printing control PC 12A and the printing management PC 13A are the same as the printing control PC 12 and the printing management PC 13, so that repeated explanations are omitted.

Figure 8:
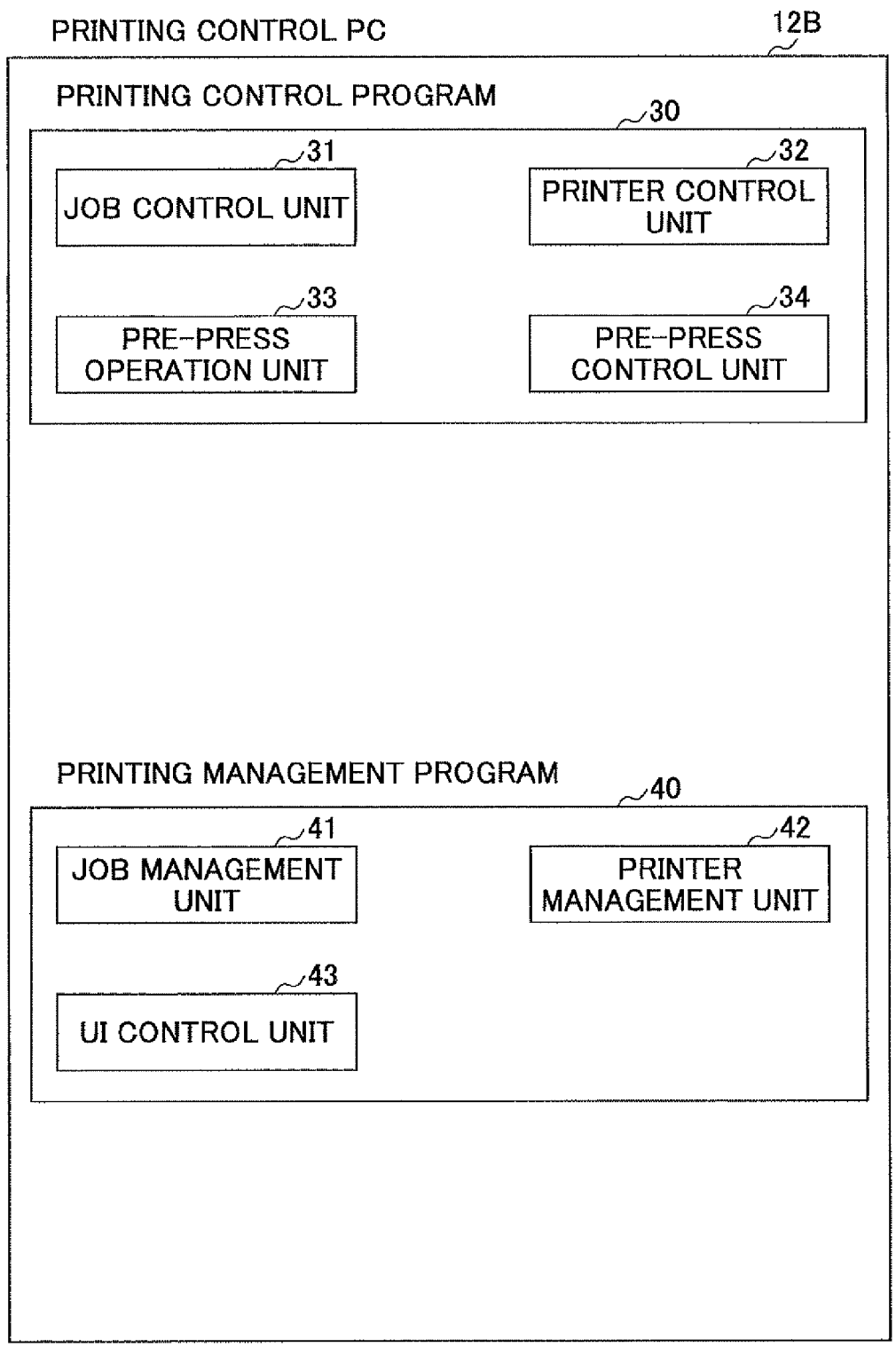
FIG. 8 is a processing block diagram of a different example of the printing control PC.

Moreover, for the system as shown in FIG. 2, the printing control PC 12 is implemented in a processing block as shown in FIG. 8, for example. FIG. 8 is a processing block diagram of a different example of the printing control PC.

In a printing control PC 12B is installed the printing control program 30 and the printing management program 40. The printing control PC 12B executes the printing control program 30 and the printing management program 40 to implement the job control unit 31, the printer control unit 32, the pre-press operation unit 33, the pre-press control unit 34, the job control unit 41, the printer management unit 42, and the UI control unit 43. The processing block features of the printing control PC 12B are the same as those of the printing control PC 12 and of the printing management PC 13, so that repeated explanations are omitted.

Process Flow

Below, a flow of a process is described in which an operator makes a tab sheet insert printing designation, so that an unused tab sheet (a tab sheet which became no longer necessary) is output (discharged) to a designated sheet-discharging destination.

(Process of Outputting Unused Tab Sheet to Designated Sheet-Discharging Destination)

Figure 9:
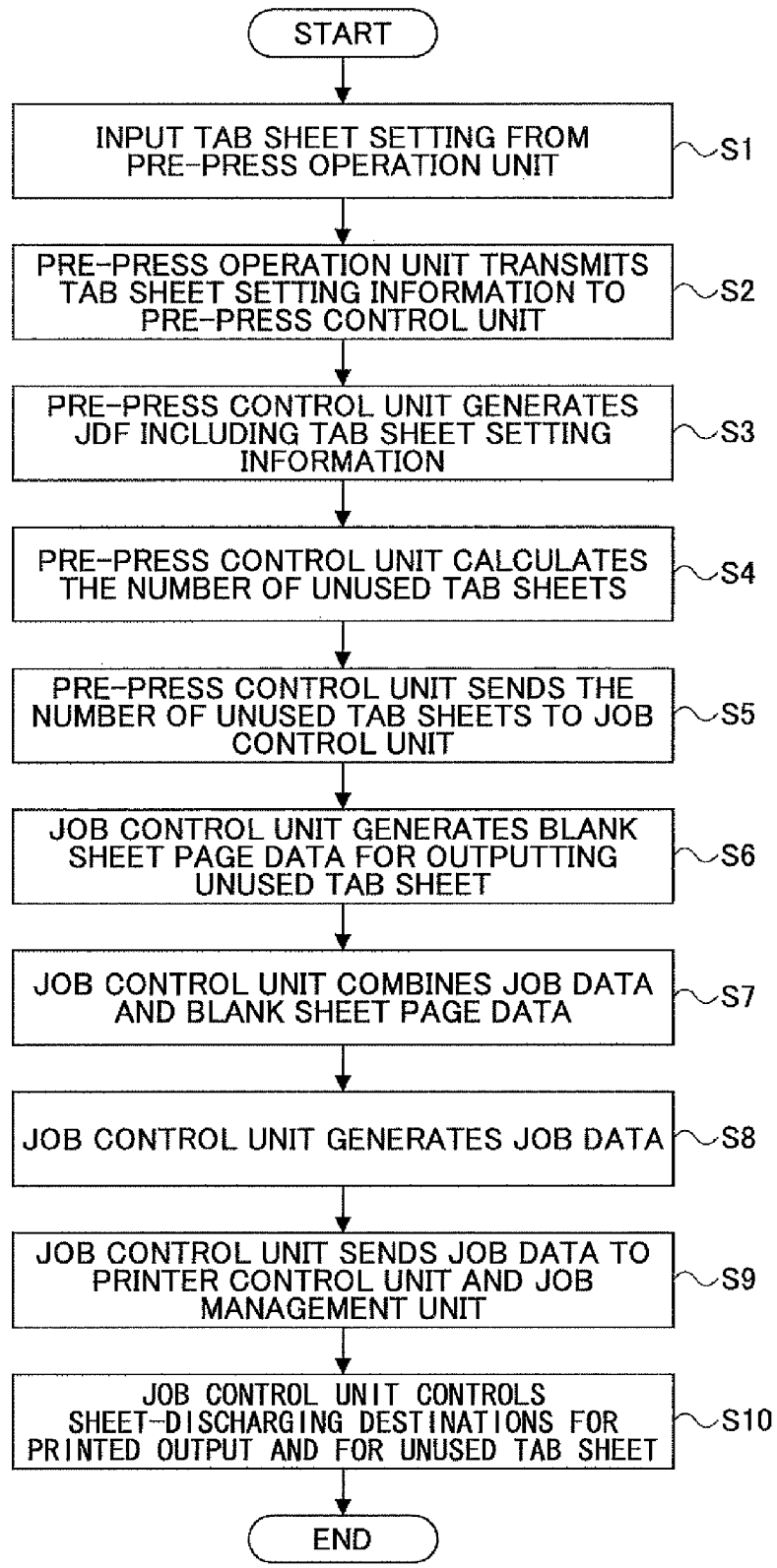
FIG. 9 is a flowchart of an example of a process in which an operator performs a tab sheet insert printing designation and outputs an unused tab sheet to a designated sheet-discharging destination.

FIG. 9 is a flowchart of an example of a process in which the operator makes the tab sheet insert printing designation and outputs the unused tab sheet to a designated sheet-discharge destination. Here, the following case is envisaged for describing the process of the flowchart in FIG. 9. The manuscript submission data is assumed to be in a PDF format. In the printer apparatus 14, one tab sheet set which includes five sheets is assumed to be placed in a tab sheet-supplying tray.

Printing conditions of the customer are set such that there are three tab sheet inserting locations. A printed output which is generated by a printing job is assumed to be discharged to a tray 1, and the unused tab sheet is assumed to be discharged to a tray 2.

In step S1, based on the printing conditions from the customer, the operator inputs a tab sheet setting from the pre-press operation unit 33 of the printing control PC 12. The tab sheet setting includes the three tab sheet inserting locations, a sheet-discharging destination of the unused tab sheet, and the number of tab sheets in one tab sheet set. Here, the number of tab sheets in the one tab sheet set is input since the one tab sheet set generally includes multiple tab sheets. In the above-described specific example, the three tab sheet inserting locations, the number "five sheets" of tab sheets in the one tab sheet set, and the sheet-discharging destination "tray 2" of the unused tab sheet are input by the operator.

In step S2, the pre-press operation unit 33 transmits tab sheet setting information input by the operator to the pre-press control unit 34. In step S3, the pre-press control unit 34 generates a JDF which describes, as the tab sheet setting information, the tab sheet inserting locations and the sheet-discharging destination of the unused tab sheet. In the above-described specific example, the tab sheet setting information which indicates the "three" tab sheet inserting locations, the sheet-discharging destination "tray 1" of the printed output and the sheet-discharging destination "tray 2" of the unused tab sheet are included in the JDF.

In step S4, in performing the JDF generation process, the pre-press control unit 34 computes the number of sheets to remain unused from the number of sheets in one tab sheet set and a tab sheet inserting location which is designated with the tab sheet setting information. In the previously-described specific example, the number of tab sheets to remain unused becomes "2", which is the number of sheets "5" in the one tab sheet set minus "3", which is the number of tab sheet insert locations.

In step S5, the pre-press control unit 34 transmits the number of tab sheets to remain unused to the job control unit 31 together with the generated JDF. In step S6, in order to output the unused tab sheets, the job control unit 31 generates blank sheet page data corresponding to the number of unused tab sheets in order to output the unused tab sheets.

In step S7, the job control unit 31 attaches the blank sheet page data to the end of the manuscript submission data. In the above-described specific example, at the end of the last page of the manuscript submission data in the PDF format, are concatenated two blank sheet pages in the PDF format. In step S8, the job control unit 31 generates a job (job data) from printing information described in the JDF and the PDF file of the manuscript data in which are attached the blank sheet page data at the end. The job data are converted into a data format which can be processed by the printer apparatus 14, such as the above-described PS format.

In the above-described specific example, when the job data are generated from the PDF file of the manuscript submission data to which are attached the blank sheet page data at the end, the job data (the first job data), which are converted to the PS data, are generated with the sheet-discharging destination of the printed output as the tray 1. Then, the job control unit 31 generates the job data (the second job data), which are converted to the PS data, with the sheet-discharging destination of the two pages of the blank sheet page as the tray 2. The job control unit 31 combines the first job data and the second job data into one job data set.

Figure 10:
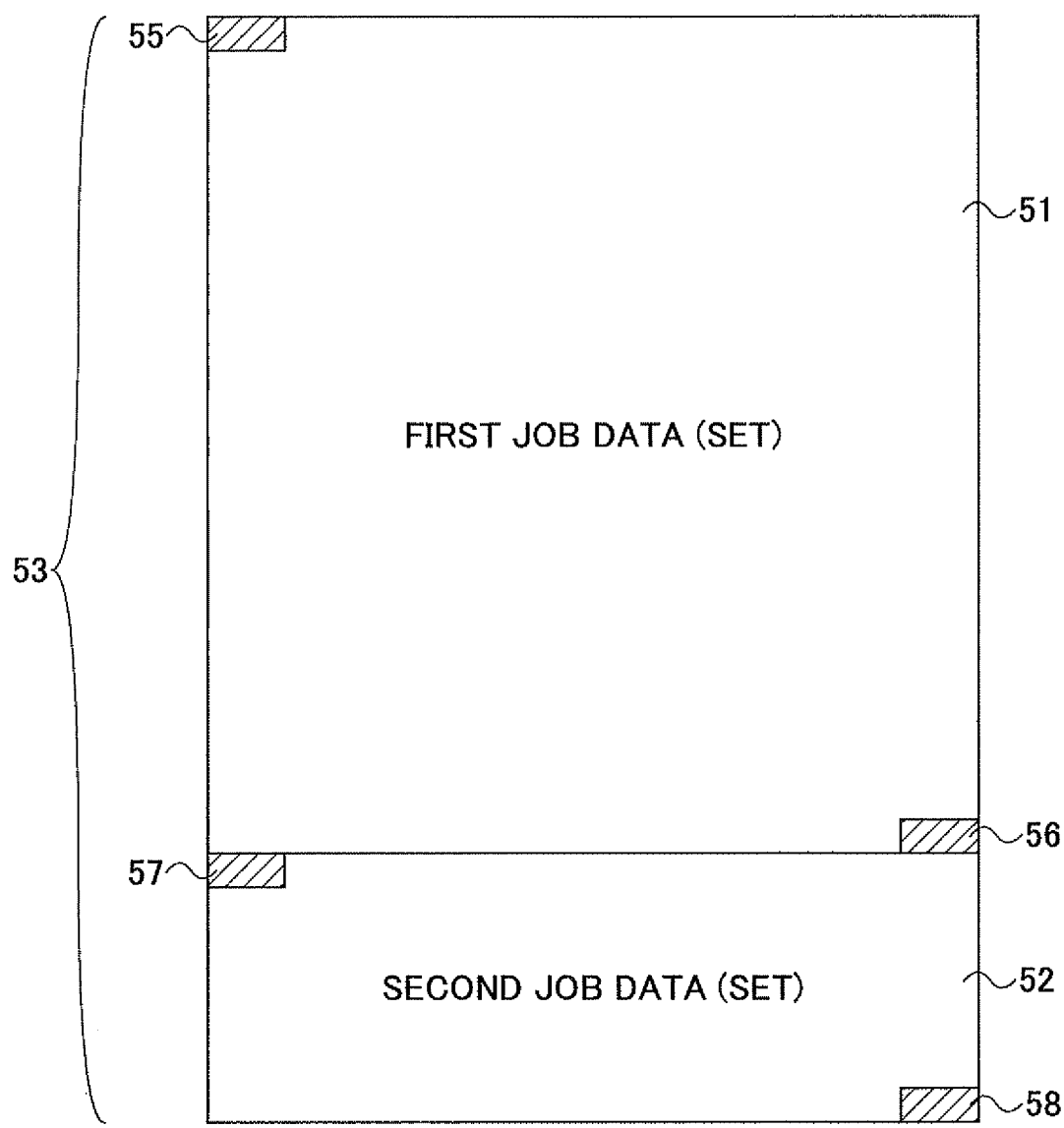
FIG. 10 is an image diagram of one example of a process in which first and second job data sets are combined into one job data set.

As shown in FIG. 10, the job control unit 31 combines the first job data and the second job data into one job data set. FIG. 10 is an image diagram of one example of a process in which the first and second job data sets are combined into the one job data set.

As shown in FIG. 10, the job control unit 31 combines a file 51 of the first job data and a file 52 of the second job data into a file 53 of the one job data set. In the file 51 of the first job data, a job starting command 55 is arranged in the beginning, while a job completing command 56 is arranged in the end. Moreover, in the file 52 of the second job data, a job starting command 57 is arranged in the beginning, while a job completing command 58 is arranged in the end.

Returning to FIG. 9, in step S9, the job control unit 31 transmits the one job data set (the file 53 of the one job data in FIG. 10) into which the first job data and the second job data are combined to the job management unit 41 of the printer management PC 13 and the printer control unit 32.

In step S10, when the printer control unit 32 receives the file 53 of the one job data set in FIG. 10, the job starting command 55, the job completing command 56, the job starting command 57, and the job completing command 58 are used to separate the file 51 of the first job data and the file 52 of the second job data.

As the sheet-discharging destination of the printed output is defined as the tray 1 in the file 51 of the first job data and the sheet-discharging destination of the unused tab sheet is defined as the tray 2 in the file 52 of the second job data, the printer control unit 32 controls the printer apparatus 14 such that the printed output is output to the tray 1 and the unused tab sheet is output to the tray 2. Therefore, the printer apparatus 14 may discharge the printed output to the tray 1 and the unused tab sheet to the tray 2, making it possible to separate the printed output from the unused tab sheet.

Moreover, the job management unit 41 of the printing management PC 13 decompresses, into a memory, the file 53 of the one job data set in FIG. 10 that is received. The job management unit 41 refers to the job starting command 55, the job completing command 56, the job starting command 57, and the job completing command 58 of the file 53 of the one job data set. When the job completing command 56 of the file 51 of the first job data and the job starting command 57 of the file 52 of the second job data follow each other, the job management unit 41 makes sure that it does not cause the UI to display the execution results and the execution conditions of the second job data. Therefore, the printing management PC 13 does not indicate the execution results or conditions of the job in which the unused tab sheet is output to the tray 2, so that an ease of use is improved for the operator.

As described above, the operator sets a sheet-discharging destination of the unused tab sheet. However, when the sheet-discharging destination is set in which outputting is not possible at the time of setting, the printer apparatus 14 is not able to correctly control sheet discharging of the unused tab sheet. In order to avoid such a phenomenon, a method is possible which makes sure that the sheet-discharging destination in which outputting is impossible is not set at the time the operator sets the sheet-discharging destination of the unused tab sheet.

(Process for Determining Whether Output to Sheet-discharging Destination is Impossible)

Figure 11:
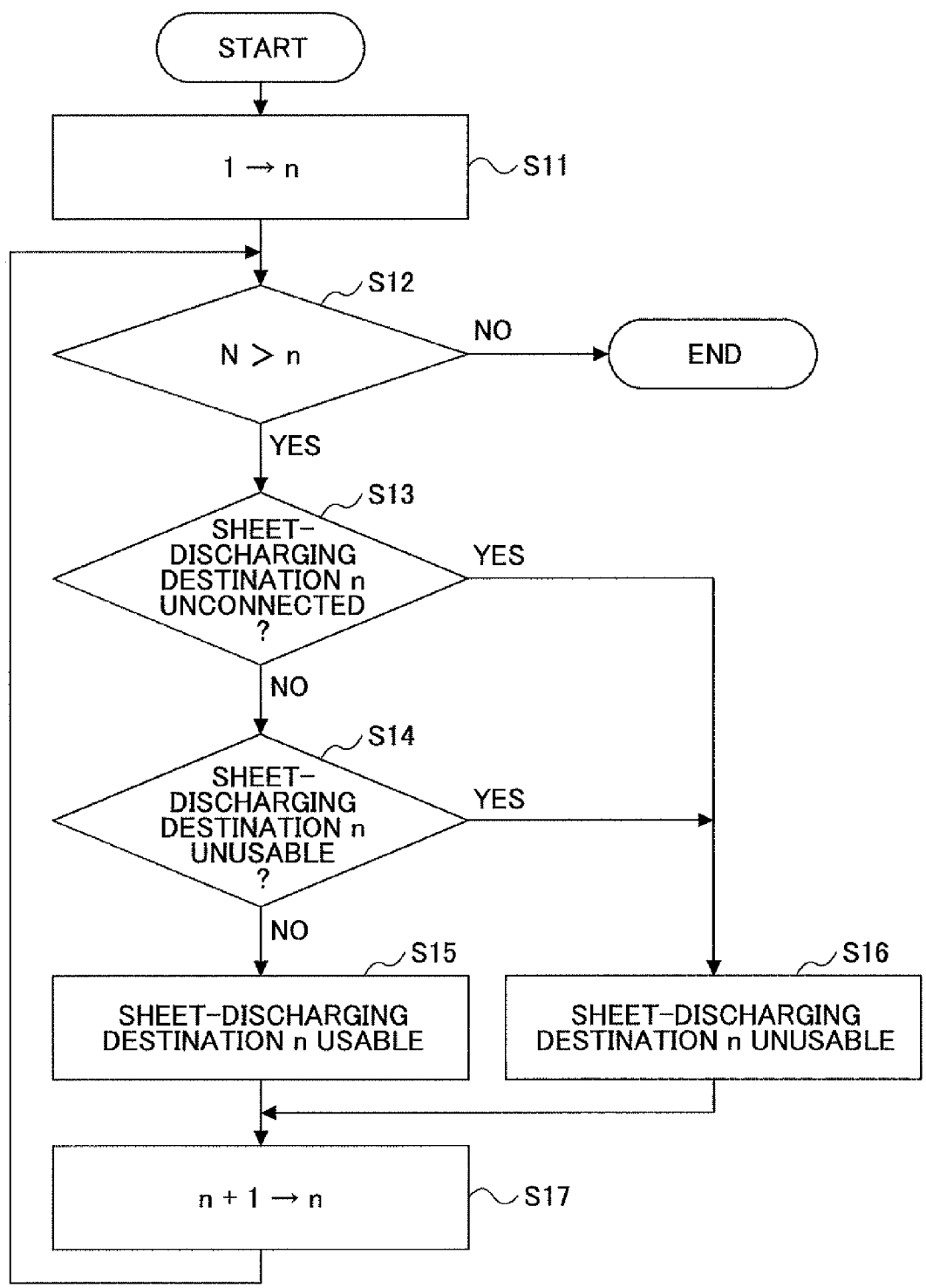
FIG. 11 is a flowchart of an example of a process which determines whether outputting is impossible when setting a sheet-discharging destination of an unused tab sheet.

FIG. 11 is a flowchart of an example of a process of determining whether outputting is impossible when setting the sheet-discharging destination of an unused tab sheet. Here, a specific example is described such that there are N sheet-discharging destinations in the printer apparatus 14 that can be set.

In step S11, the printer control unit 32 assigns 1 to n. In step S12, the printer control unit 32 determines whether n is smaller than N. If n is smaller than N, the printer control unit 32 determines whether the sheet discharge destination n=1 is disconnected from the printer apparatus 14.

As a method of determining whether the sheet-discharging destination is disconnected from the printer apparatus 14, a method of determining using a SNMP response is generally known. When the sheet-discharging destination n=1 is connected to the printer apparatus 14, the printer control unit 32 determines, in step S14, whether the sheet-discharging destination n=1 is unusable (the sheet cannot be output). As a case that the sheet-discharging destination is unusable, there is a status such that the sheet-discharging tray is FULL, a status such that outputting of the tab sheet is not handled, etc. As a method of obtaining such statuses as described above, a method of determining by the above-described SNMP response is generally known.

When the sheet-discharging destination n=1 is usable, the printer control unit 32*b* records that the sheet-discharging destination n=1 is usable. On the other hand, when the sheet-discharging destination n=1 is not connected to the printer apparatus 14 in step S13 or when the sheet-discharging destination n=1 is unusable in step S14, the printer control unit 32 records that the sheet-discharging destination n=1 is unusable.

In step S17, after adding 1 to n, the printer control unit 32 returns to the process in step S12. In other words, the printer control unit 32 repeats the process of steps S12-S17 for the sheet-discharging destination n=2. In this way, the printer control unit 32 repeats the process of steps S12-S17 up to the connecting destination n=N.

The printer control unit 32 can perform the process of the flowchart in FIG. 11 to hold information on the usable sheet-discharging destination. When the operator sets the sheet-discharging destination of the unused tab sheet, the pre-press operation unit 33 can use information on the usable sheet-discharging destination to set only the usable sheet discharge destination. Therefore, the pre-press operation unit 33 can makes sure that the unusable sheet-discharging destination is not set when the operator sets the sheet-discharging destination of the unused tab sheet.

(Job Format)

Figure 12:
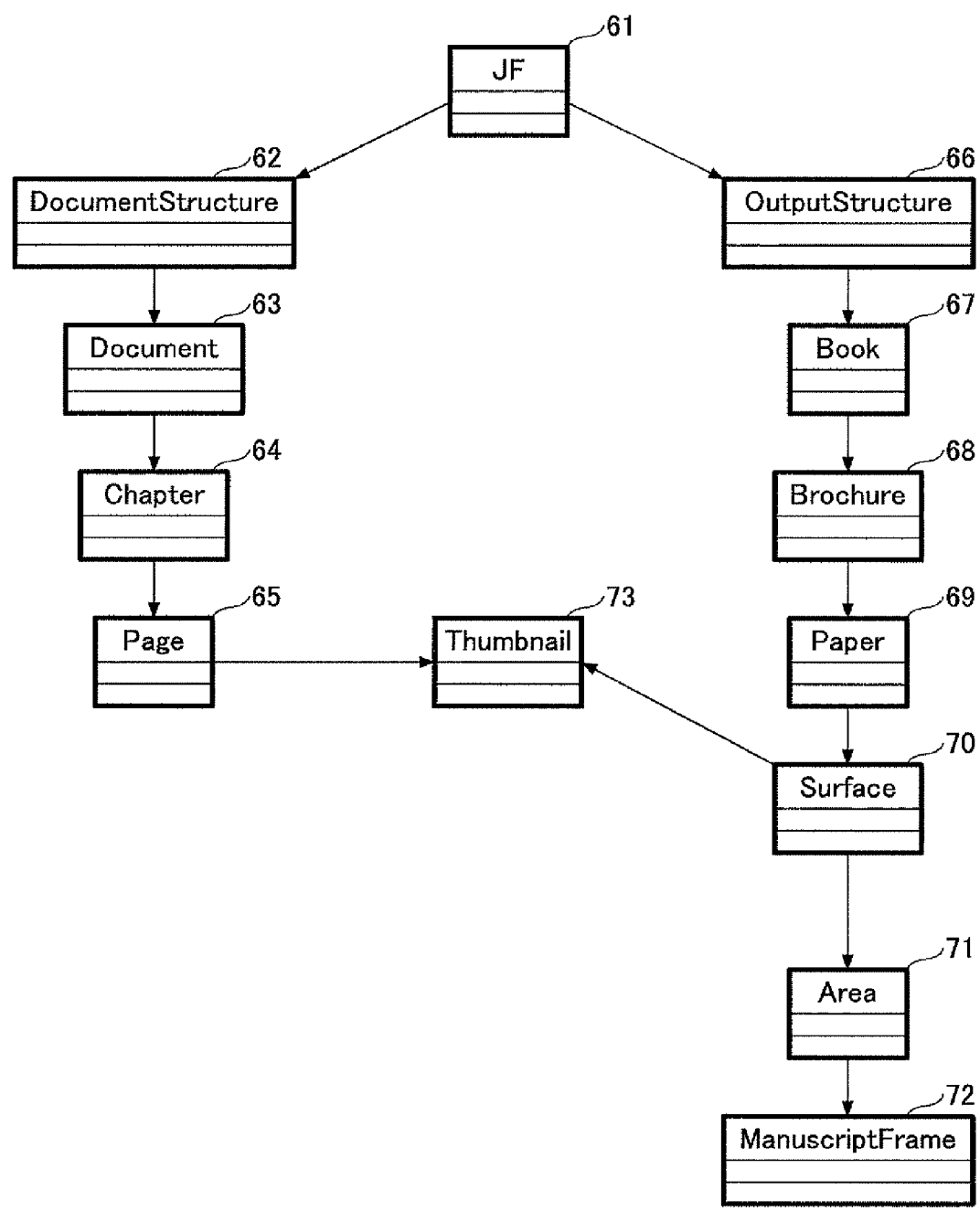
FIG. 12 is a data configuration diagram of an example of a job format.

The printing control PC 12 handles a JF (job format) with a configuration shown in FIG. 12. FIG. 12 is a data configuration diagram of an example of the job format.

A JF 61 shown in FIG. 12 is a proprietarily formatted JDF, for example. Responsibilities of the JF include at least holding document structure data 62 and output structure data 66. Moreover, the JF 61 causes the document structure data 62 and the output structure data 66 to cooperate to generate data for displaying and data for printing.

The document structure data 62, which include document data 63, chapter data 64, and page data 65, resolve a relationship of the document data 63, the chapter data 64, and the page data 65 to express a structure as a document. The output structure data 66, which includes book data 67, brochure data 68, paper data 69, surface data 70, area data 71, and manuscript frame data 72, resolve a relationship of the book data 67, the brochure data 68, the paper data 69, the surface data 70, the area data 71, and the manuscript frame data 72 to express a structure for outputting (one book).

The document data 63, representing a root element of the document, include multiple chapters. The chapter data 64, representing an element which makes up the document, include multiple pages. The page data 65, which represent an element which makes up the chapter, and which exist on a one-on-one basis with a manuscript page (a PDF page, for example), resolve mapping with the manuscript page.

The book data 67, representing a root element of an output (one book), include multiple brochures. The brochure data 68, representing an element which makes up the book, include multiple papers. The paper data 69, representing an element which makes up the brochure, include multiple surfaces. The surface data 70, representing an element which makes up the paper, include multiple areas. The surface data 70 express physical surfaces, which surfaces include a front face and a back face.

Moreover, the area data 71, representing an element which makes up the surface, include multiple manuscript frames. The area data 71 express repeating of a set of the manuscript frames for the same surface. The manuscript frame data 72 represent an element which makes up the area. Contents of the page data 65 of the document structure data 62 are arranged in the manuscript frame data 72, so that they become the data for displaying and for printing.

The page data 65 include thumbnail data 73 which are used for "manuscript page edit" screen displaying and for "page sequence/structure edit" screen displaying of a manuscript page. Moreover, the surface data 70 include the thumbnail data 73 which are used for "sheet/pagination/post-processing" screen displaying and for "output method/setting" screen displaying.

Figure 13:
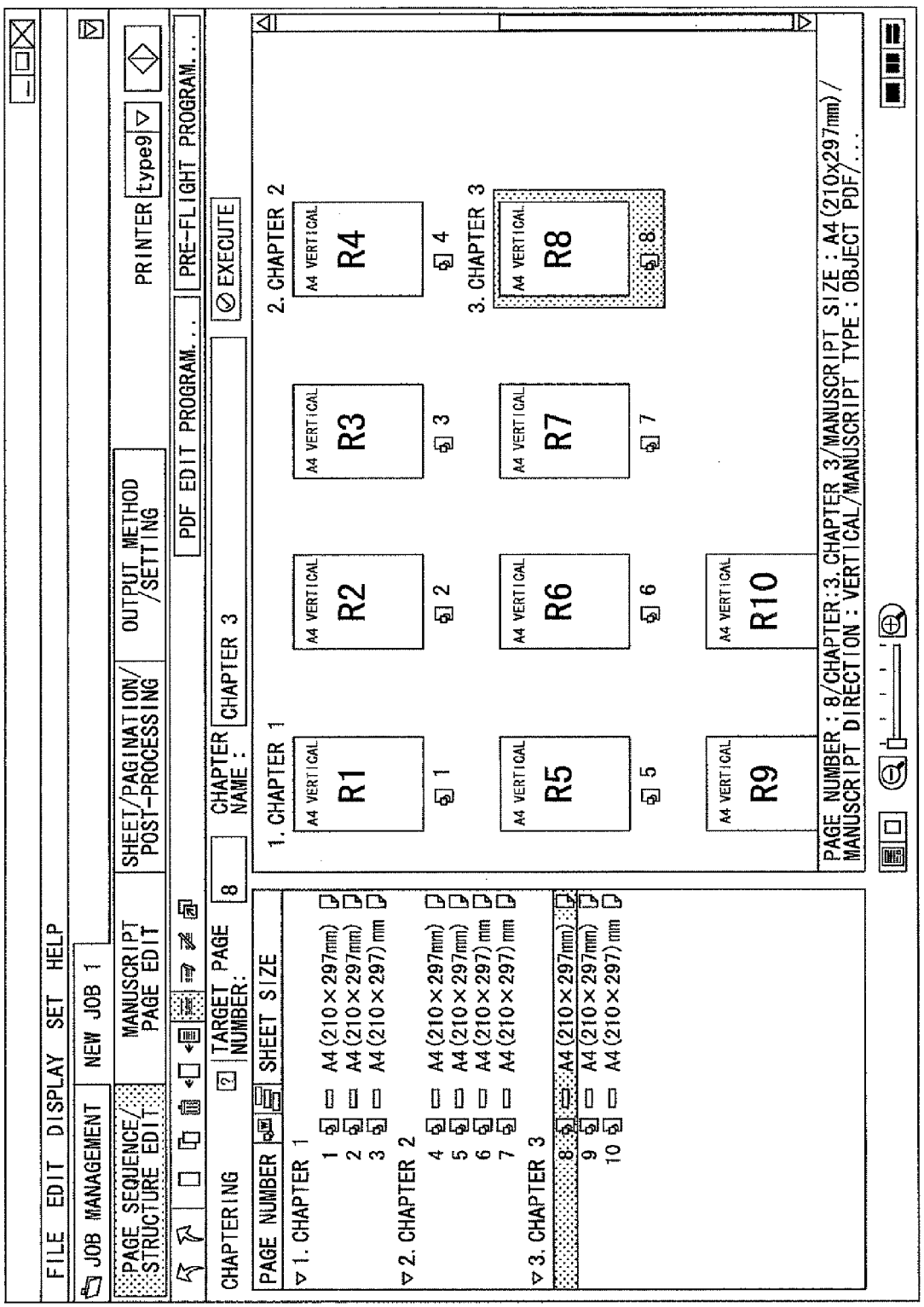
FIG. 13 is an image diagram of an exemplary "page sequence/structure edit" screen of a manuscript page.

FIG. 13 is an image diagram of an exemplary "page sequence/structure edit" screen of the manuscript page. The thumbnail data 73, the chapter data 64, and the page data 65 of the document structure data 62 may be used to display the "page sequence/structure edit" screen of the manuscript page shown in FIG. 13.

Figure 14:
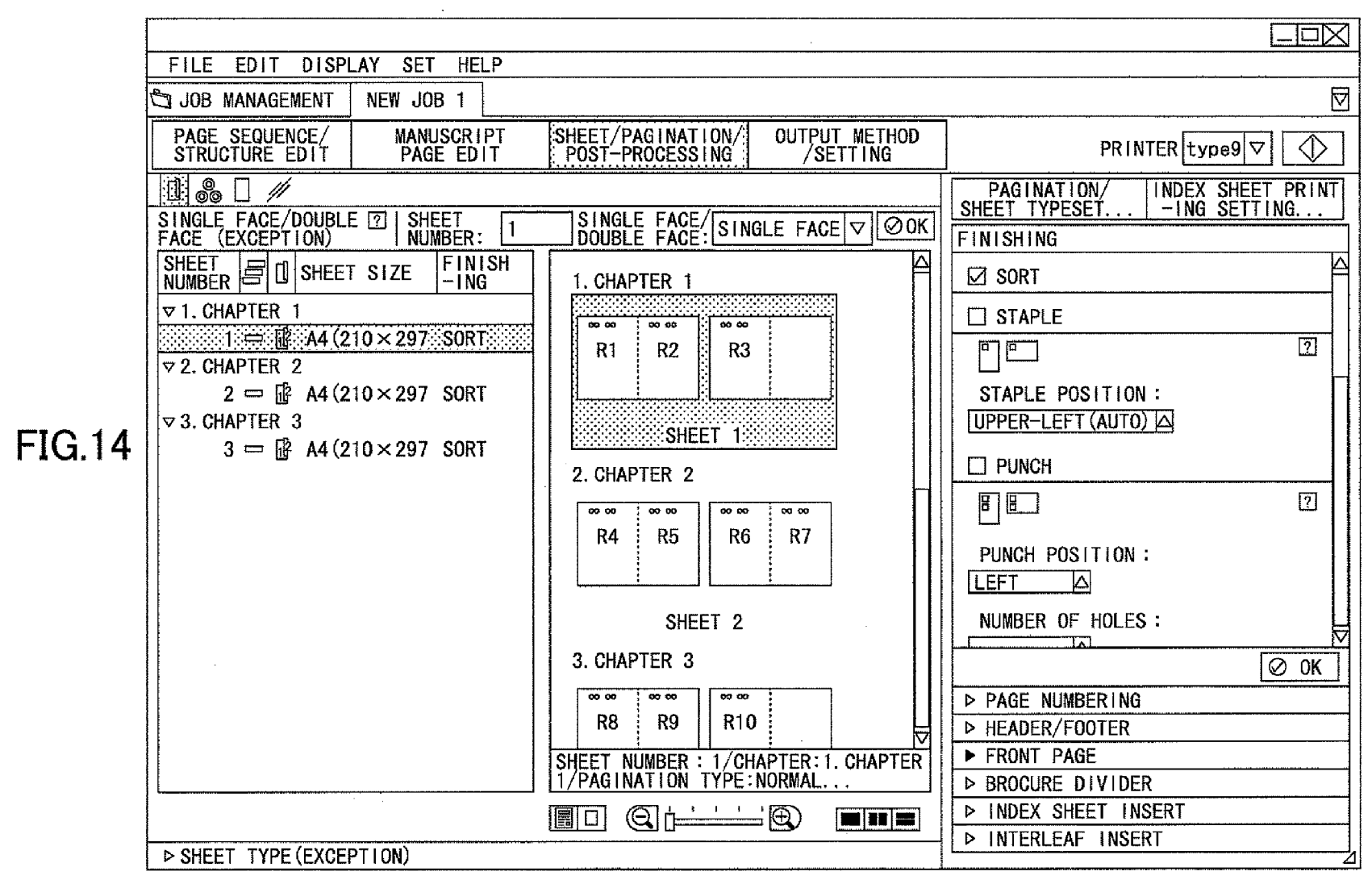

FIG. 14 is an image diagram of an exemplary "sheet/pagination/post-processing" screen. The thumbnail data 73, the brochure data 68, the paper data 69, the surface data 70, the area data 71, and the manuscript frame data 72 of the output structure data 66 may be used to display the "sheet/pagination/post-processing" screen in FIG. 14. The "sheet/pagination/post-processing" screen in FIG. 14 is an example of a case in which the number of collections "2" and double-face are set as pagination conditions.

(Details of Steps S1-S5)

Figure 15:
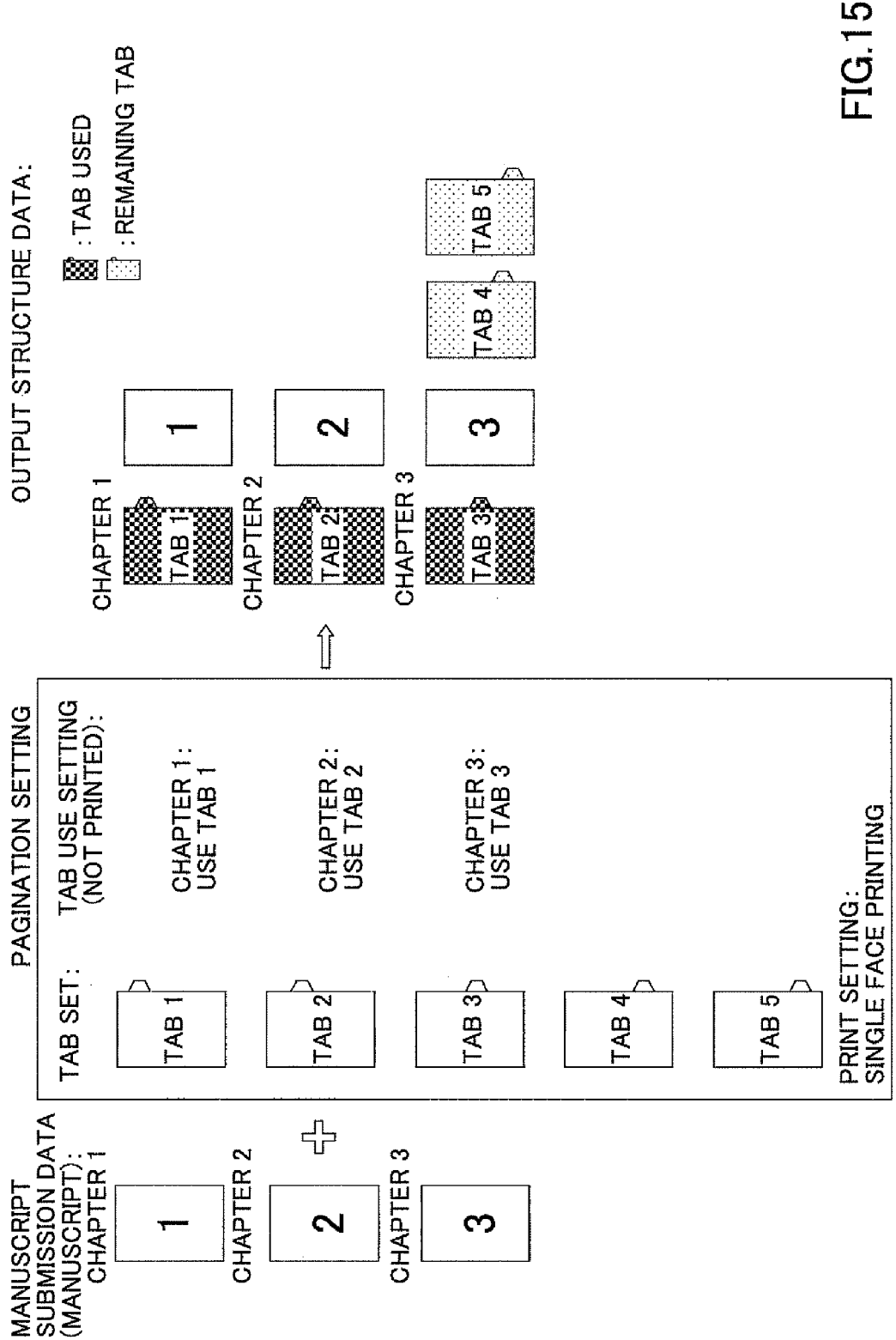
FIG. 15 is an image diagram of an example of a process of steps S1-S5.

FIG. 15 is an image diagram of an example of a process of steps S1-S5. The example in FIG. 15 shows that the manuscript submission data from the customer include three chapters and that each of the chapters includes a one page manuscript. Moreover, in the example in FIG. 15, in step S1, an example is shown of the operator inputting the tab sheet setting information from the pre-press operation unit 33 of the printing control PC 12 based on the printing conditions from the customer.

An example is shown of a beginning of each chapter being set as three tab sheet inserting locations for the tab sheet setting information. While not shown, it is assumed that the sheet-discharging destination "the tray 2" for the unused tab sheets and the number of sheets "5" in the tab sheet set are set for the tab sheet setting information.

Figure 16:
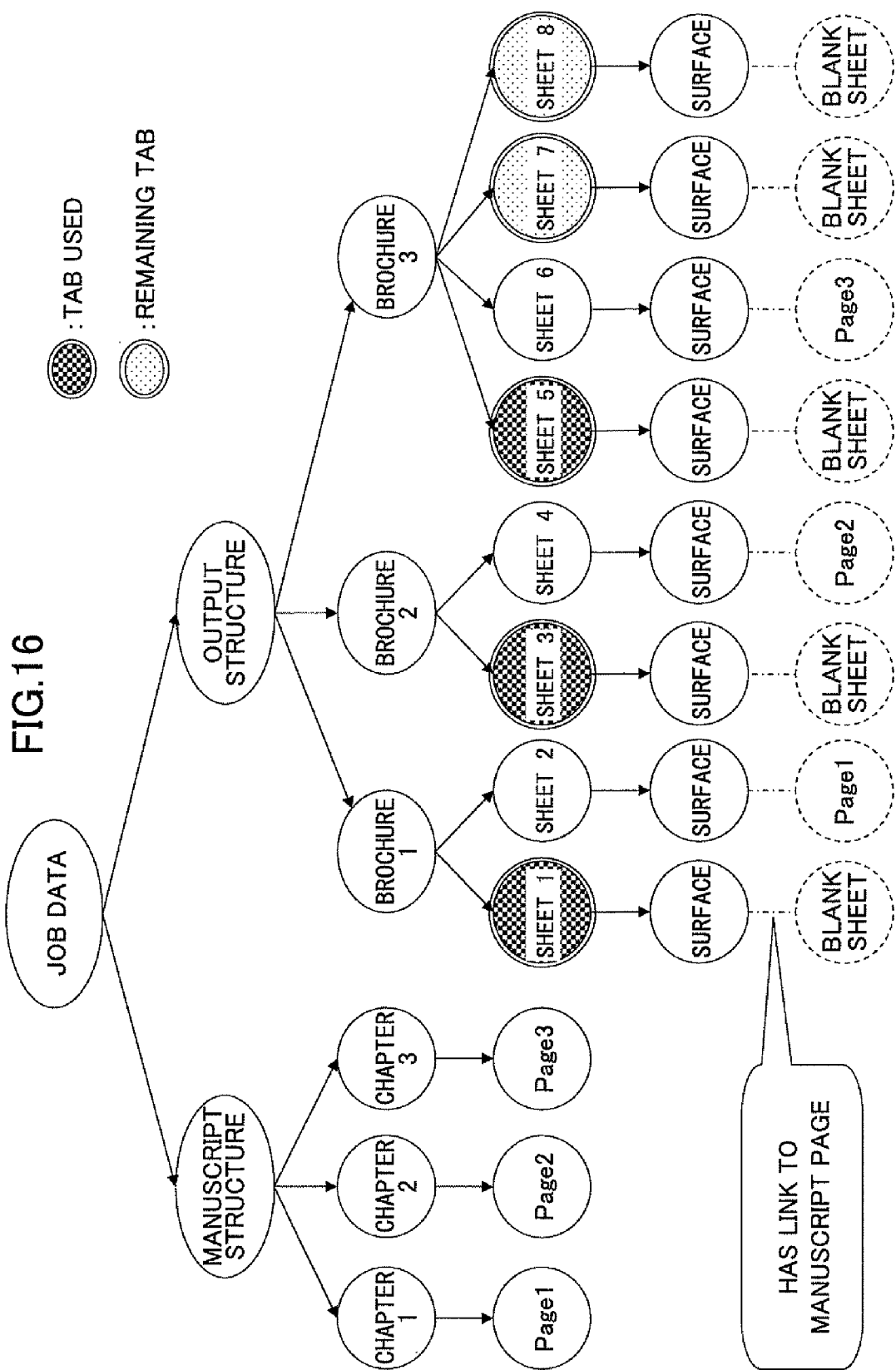
FIG. 16 is a structural diagram of an example of job data.

In step S2, the pre-press operation unit 33 transmits the tab sheet setting information input from the operator to the pre-press control unit 34. In step S3, the pre-press control unit 34 uses received tab sheet setting information to generate the JDF which includes the contents of the output structure data 66 shown in FIGS. 15 and 16. The output structure data 66 in FIG. 15 represent an image of an output structure. The output structure data 66 in FIG. 16 are shown in the job format. As shown in FIGS. 15 and 16, tab sheets "tab 4" and "tab 5" to be unused are inserted at the end in the output structure data 66.

In step S4, the pre-press control unit 34 calculates the number "2" of tab sheets to remain unused from the number "5" of tab sheets in the one tab sheet set and the number "3" of the tab sheet inserting locations designated with the tab sheet setting information. In step S5, the pre-press control unit 34 transmits the number "2" of tab sheets to remain unused to the job control unit 31 together with the generated JDF.

(Details of Steps S6-S9)

Figure 17:
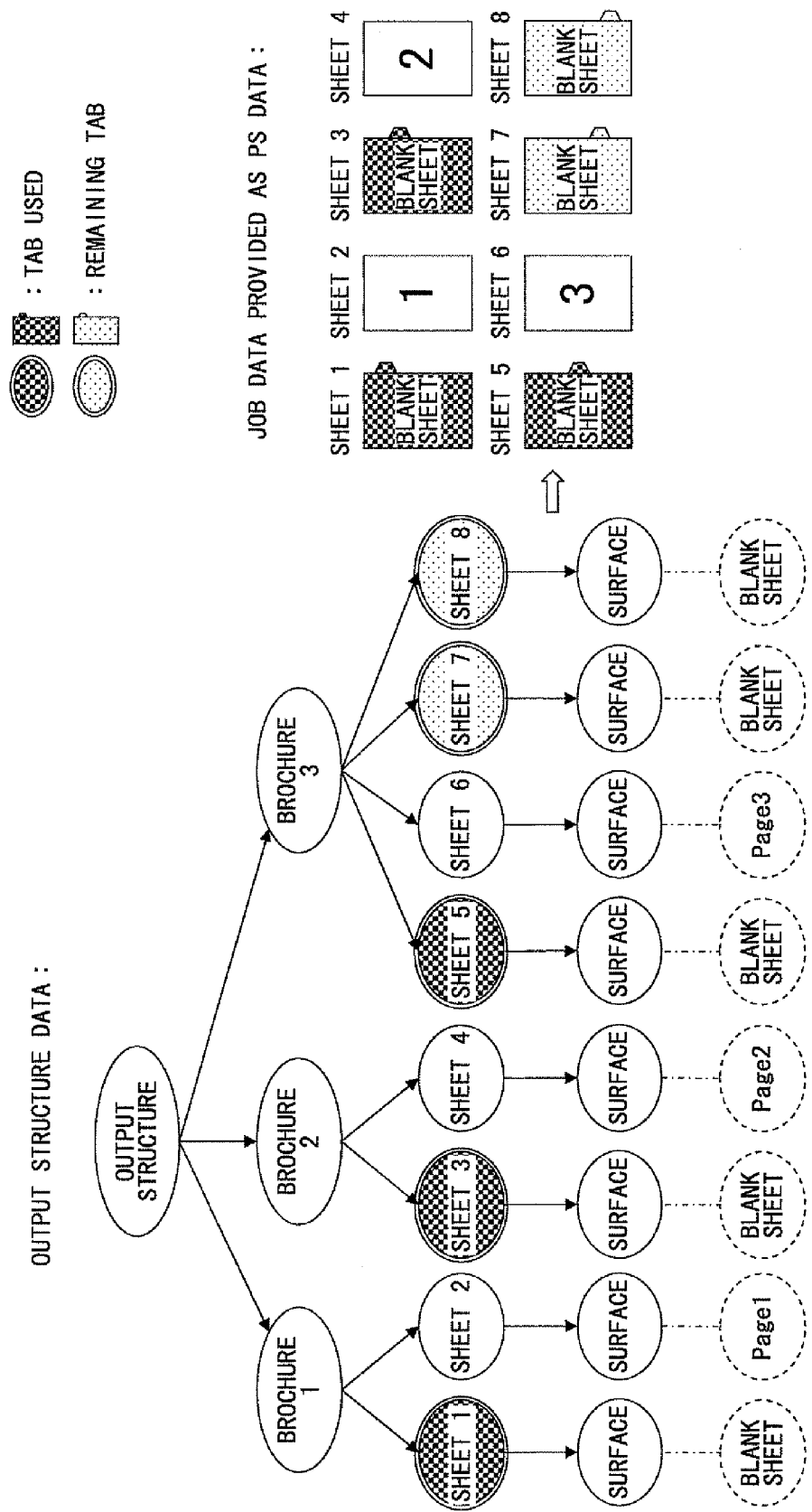
FIG. 17 is an image diagram of an example of a process in steps S6-S9.

FIG. 17 is an image diagram of an example of a process in steps S6-S9. In step S6, in order to output the unused tab sheets "tab 4" and "tab 5", the job control unit 31 generates blank sheet page data corresponding to the number "2" of tab sheets to remain unused.

In step S7, the job control unit 31 attaches the blank page data at the end of the manuscript submission data. The manuscript submission data have concatenated two blank sheet pages in a PDF format at the end of the last page.

In step S8, the job control unit 31 generates job data as PS data from printing information described in the JDF and a PDF file of the manuscript data, at the end of which the blank sheet page data are attached. For example, the job control unit 31 generates a job data set (a first job data set) as the PS data with the sheet-discharging destination of the printed output as the tray 1. Moreover, the job control unit 31 generates a job data set (a second job data set) as the PS data with the sheet-discharging destination of two blank sheet pages as the tray 2. Then, the job control unit 31 combines the first job data set and the second job data set into one job data set.

In step S9, the job control unit 31 transmits the one job data (the file 53 of the job data in FIG. 10, for example) into which the first job data set and the second job data set are combined to the job control unit 41 of the printing management PC 13 and the printer control unit 32.

Details of Step S10

Figure 18:
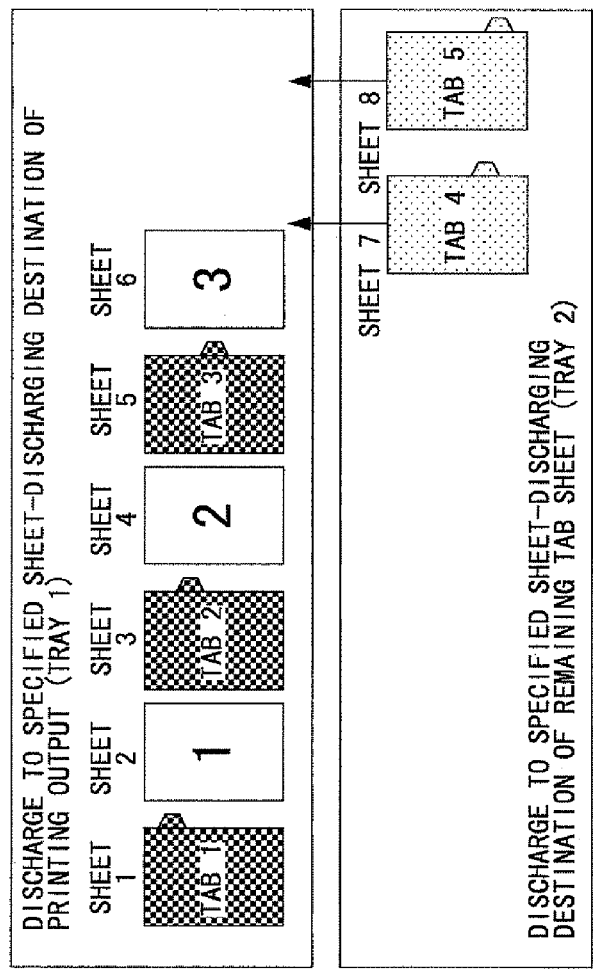
FIG. 18 is an image diagram of an example of a process of step S10.

FIG. 18 is an image diagram of an example of a process of step S10. For example, when the printer control unit 32 receives the file 53 of the one job data, the job starting command 55, the job completing command 56, the job starting command 57, and the job completing command 58 may be used to separate the file 51 of the first job data set and the file 52 of the second job data set.

As the sheet-discharging destination of the printed output is defined as the tray 1 in the file 51 of the first job data set and the sheet-discharging destination of a remaining tab sheet (unused tab sheet) is defined as the tray 2 in the file 52 of the second job data set, the printer control unit 32 controls the printer apparatus 14 such that sheets 1-6, which are printed outputs, are output to the tray 1 and sheets 7-8, which are unused tab sheets, are output to the tray 2. Therefore, the printer apparatus 14 may discharge the printed output to the tray 1 and the unused tab sheet to the tray 2, making it possible to separate a printed output and an unused tab sheet.

(Conclusion)

According to the present invention, an operator can cause an unused tab sheet to be output to an arbitrary sheet-discharging destination without having to remove the unused tab sheet. Moreover, the operator is prevented from being shown execution results or execution conditions of a job which outputs an unused tab sheet to a sheet-discharging destination. Therefore, ease of use of a UI which displays execution results and execution conditions of a printing job are improved.

The present invention is not limited to the specific embodiments disclosed, so that variations and changes are possible without departing from the claims of the present application.

The present application is based on Japanese Priority Applications No. 2011-020221 filed on Feb. 1, 2011 and No. 2012-001561 filed on Jan. 6, 2012, the entire contents of which are hereby incorporated by reference.

The invention claimed is:

1. A non-transitory computer-readable storage medium storing a printing control program which, when executed, causes a computer to function as:

a calculating unit configured to calculate a number of unused tab sheets based on setting information on a tab sheet to be inserted into manuscript submission data;

a page data generating unit configured to generate page data for outputting the unused tab sheets, the number of which unused tab sheets corresponding to the calculated number of the unused tab sheets;

a job data generating unit configured to generate one job data set into which a first data job set and a second data set are combined, the first job data set being for outputting a printed output to a first sheet-discharging destination based on the manuscript submission data and the second job data set being for outputting the unused tab sheet to a second sheet-discharging destination based on the page data; and a job data transmitting unit configured to transmit the one job data set to a job management unit which causes information on job data to be displayed on a display apparatus, wherein the job data generating unit is configured to arrange a job starting command at a beginning of the first job data set, arrange a job completing command at an end of the first job data set, arrange a job starting command at a beginning of the second job data set, and arrange a job completing command at an end of the second job data set, and wherein, when the job completing command which is arranged at the end of the first job data set and the job starting command which is arranged at the beginning of the second job data set are adjacent to each other, information on the second job data set is not displayed in the display apparatus.

2. The non-transitory computer-readable storage medium of claim 1, wherein the printing control program, when executed, further causes the computer to function as:
- a sheet-discharging destination information obtaining unit, configured to obtain information on a sheet-discharging destination which is usable from a printer apparatus which performs processing according to the first job data set and the second job data set; and
- a sheet-discharging destination selecting unit configured to select a sheet-discharging destination of the unused tab sheet from the usable sheet-discharging destination.

3. The non-transitory computer-readable storage medium of claim 1, wherein the calculating unit, based on the number of tab sheets in a tab sheet set and one or more tab sheet inserting locations which are included in setting information on the tab sheet to be inserted into the manuscript submission data, is configured to subtract the number of tab sheet inserting locations from the number of tab sheets in the tab sheet set to calculate the number of unused tab sheets.

4. A printing control unit, comprising:
- a calculating unit, configured to calculate a number of unused tab sheets based on setting information on a tab sheet to be inserted into manuscript submission data;
- a page data generating unit configured to generate page data for outputting the unused tab sheets, the number of which unused tab sheets corresponding to the calculated number of the unused tab sheets;
- a job data generating unit configured to generate one job data set into which a first job data set and a second job data set are combined, the first job data set being for outputting a printed output to a first sheet-discharging destination based on the manuscript submission data and the second job data set being for outputting the unused tab sheet to a second sheet-discharging destination based on the page data;
- a job data transmitting unit configured to transmit the one job data set to a job management unit which causes information on job data to be displayed on a display apparatus;
- a sheet-discharging destination information obtaining unit configured to obtain information on a sheet-discharging destination which is usable from a printer apparatus which performs processing according to the first job data set and the second job data set; and
- a sheet-discharging destination selecting unit configured to select a sheet-discharging destination of the unused tab sheet from the usable sheet-discharging destination, wherein the second job data set includes instructions for outputting the unused tab sheet at the end of the printed output of the of the first job data set.

5. A printing control method executable by a computer, the method comprising:
- calculating a number of unused tab sheets based on setting information on a tab sheet to be inserted into manuscript submission data;
- generating page data for outputting the unused tab sheets, the number of which unused tab sheets corresponding to the calculated number of the unused tab sheets;
- generating one job data set into which a first job data set and a second job data set are combined, the first job data set being for outputting a printed output to a first sheet-discharging destination based on the manuscript submission data and the second job data set being for outputting the unused tab sheet to a second sheet-discharging destination based on the page data;
- transmitting the one job data set to a job management unit which causes information on job data to be displayed on a display apparatus;
- obtaining information on a sheet-discharging destination which is usable from a printer apparatus which performs processing according to the first job data set and the second job data set; and
- selecting a sheet-discharging destination of the unused tab sheet from the usable sheet-discharging destination, wherein the second job data set includes instructions for outputting the unused tab sheet at the end of the printed output of the of the first job data set.

6. A printing control unit, comprising:
- a calculating unit, configured to calculate a number of unused tab sheets based on setting information on a tab sheet to be inserted into manuscript submission data;
- a page data generating unit configured to generate page data for outputting the unused tab sheets, the number of which unused tab sheets corresponding to the calculated number of the unused tab sheets;
- a job data generating unit configured to generate one job data set into which a first job data set and a second job data set are combined, the first job data set being for outputting a printed output to a first sheet-discharging destination based on the manuscript submission data and the second job data set being for outputting the unused tab sheet to a second sheet-discharging destination based on the page data;
- a job data transmitting unit configured to transmit the one job data set to a job management unit which causes information on job data to be displayed on a display apparatus;
- wherein the job data generating unit is configured to arrange a job starting command at a beginning of the first job data set, arrange a job completing command at an end of the first job data set, arrange a job starting command at a beginning of the second job data set, and arrange a job completing command at an end of the second job data set, and wherein,
- when the job completing command which is arranged at the end of the first job data set and the job starting command which is arranged at the beginning of the second job data set are adjacent to each other, information on the second job data set is not displayed in the display apparatus.

7. A printing control method executable by a computer, the method comprising:
- calculating a number of unused tab sheets based on setting information on a tab sheet to be inserted into manuscript submission data;
- generating page data for outputting the unused tab sheets, the number of which unused tab sheets corresponding to the calculated number of the unused tab sheets;
- generating one job data set into which a first job data set and a second job data set are combined, the first job data set being for outputting a printed output to a first sheet-discharging destination based on the manuscript submission data and the second job data set being for outputting the unused tab sheet to a second sheet-discharging destination based on the page data;
- transmitting the one job data set to a job management unit which causes information on job data to be displayed on a display apparatus;
- wherein the job data generating unit is configured to arrange a job starting command at a beginning of the first job data set, arrange a job completing command at an end of the first job data set, arrange a job starting command at a beginning of the second job data set, and arrange a job completing command at an end of the second job data set, and wherein, when the job completing command which is arranged at the end of the first job data set and the job starting command which is arranged at the beginning of the second job data set are adjacent to each other, information on the second job data set is not displayed in the display apparatus.

* * * * *